United States Patent [19]

Kuwamura et al.

[11] Patent Number: 5,616,645

[45] Date of Patent: Apr. 1, 1997

[54] GELLED FLUORIDE RESIN FINE PARTICLE DISPERSION, METHOD OF PRODUCTION THEREOF, AND PRESERVATION METHOD FOR AN ALKALINE INORGANIC HARDENED BODY UTILIZING THE SAME

[75] Inventors: Shin'ichi Kuwamura, Nara-ken; Yoshinobu Deguchi; Tokio Goto, both of Takaishi; Fumio Yoshino, Izumiohtsu, all of Japan

[73] Assignee: Dainippon Ink & Chemicals, Inc., Tokyo, Japan

[21] Appl. No.: 272,612

[22] Filed: Jul. 11, 1994

Related U.S. Application Data

[63] Continuation of Ser. No. 859,736, Jun. 15, 1992, abandoned.

[30] Foreign Application Priority Data

Oct. 30, 1990 [JP] Japan ............................... 2-292466
Dec. 27, 1990 [JP] Japan ............................... 2-408018
Mar. 26, 1991 [JP] Japan ............................... 3-061762
Oct. 30, 1991 [WO] WIPO ....................... PCT/JP91/01483

[51] Int. Cl.⁶ .................................................. C08L 27/12
[52] U.S. Cl. ........................ 524/546; 428/421; 523/328; 523/340; 524/794; 524/805; 524/3; 524/7; 524/455; 524/456; 524/457; 524/544; 524/545; 524/745; 524/747; 524/760; 524/761; 524/762
[58] Field of Search ...................... 524/544, 545, 524/546, 794, 375, 457, 745, 747, 760, 442, 462, 464, 761, 762, 805, 547, 806, 3, 7, 455, 456; 526/249, 253, 255, 240, 254, 279; 428/421; 523/328, 340

[56] References Cited

U.S. PATENT DOCUMENTS

| | | | |
|---|---|---|---|
| 3,752,796 | 8/1973 | Mueller et al. ..................... | 260/92.1 |
| 3,830,770 | 8/1974 | Ribbans, III ........................ | 260/29.6 F |
| 3,940,359 | 2/1976 | Chambers .......................... | 524/544 X |
| 4,125,673 | 11/1978 | Roth et al. ........................ | 524/546 X |
| 4,130,523 | 12/1978 | Hoy et al. .......................... | 524/806 X |
| 4,225,482 | 9/1980 | Ferren et al. ...................... | 524/546 X |
| 4,687,803 | 8/1987 | Teramoto et al. .................. | 524/545 X |
| 4,692,493 | 9/1987 | Sulzbach et al. ................... | 524/805 |
| 4,708,988 | 11/1987 | Tabb .................................. | 526/254 X |
| 4,886,862 | 12/1989 | Kuwamura et al. ................. | 526/247 |
| 5,043,393 | 8/1991 | Honma et al. ..................... | 524/546 X |
| 5,242,972 | 9/1993 | Negishi et al. ..................... | 524/547 X |

FOREIGN PATENT DOCUMENTS

| | | | |
|---|---|---|---|
| 0182516 | 5/1986 | European Pat. Off. ............. | 524/805 |
| 0360575 | 3/1990 | European Pat. Off. ............. | 524/805 |
| 2406781 | 8/1975 | Germany ........................... | 524/544 |
| 47-10635 | 5/1972 | Japan . | |
| 49-51343 | 5/1974 | Japan . | |
| 57-38845 | 3/1982 | Japan . | |
| 61-261367 | 11/1986 | Japan . | |
| 62-84137 | 4/1987 | Japan . | |
| 2-240155 | 9/1990 | Japan . | |
| 2-240154 | 9/1990 | Japan . | |
| 7508323 | 1/1976 | Netherlands ...................... | 524/544 |
| 0866417 | 4/1961 | United Kingdom ................ | 524/544 |

*Primary Examiner*—Judy M. Reddick
*Attorney, Agent, or Firm*—Armstrong, Westerman, Hattori, McLeland & Naughton

[57] ABSTRACT

The present invention relates to a gelled fluoride resin fine particle dispersion for use as a coating, to a method of production thereof, and to a method using this gelled fluoride resin fine dispersion to protect an alkaline inorganic hardened body.

The objective of the present invention is to provide an aqueous resin for use as a coating, this aqueous resin being able to form a high performance coating film that is superior in its ability to inhibit the leaching out of the alkaline substance from the alkaline inorganic hardened body, which has excellent weatherability, water resistance, alkaline resistance, and dirt picking resistance.

The present invention accomplishes the stated objective through the utilization of gelled fine particles of a fluorine containing resin.

The present invention may be used in the coating field.

34 Claims, No Drawings

GELLED FLUORIDE RESIN FINE PARTICLE DISPERSION, METHOD OF PRODUCTION THEREOF, AND PRESERVATION METHOD FOR AN ALKALINE INORGANIC HARDENED BODY UTILIZING THE SAME

This application is a continuation of application Ser. No. 07/859,736 filed Jun. 15, 1992, now abandoned.

BACKGROUND OF THE INVENTION

Field of the Invention

The present invention relates to a gelled fluoride resin fine particle dispersion for use as a coating, to a method of production thereof, and to a method using this gelled fluoride resin fine particle dispersion to protect an alkaline inorganic hardened body.

Additionally, in detail, the present invention relates to a gelled fluoride resin fine particle dispersion which is coated onto inorganic building materials which comprise, in particular, an alkaline inorganic hardened body such as a concrete, mortar, and which excels in its ability to prevent leaching of the alkaline substance, and, besides which, is of a specific composition forming a coating which is excellent with respect to its weatherability, water resistance, and to its alkaline resistance and dirt picking resistance. The present invention further relates to a method of production of this gelled fluoride resin fine particle dispersion and to a method, using the same, for protecting an alkaline inorganic hardened body.

In the construction field, a coating process is applied on the surfaces of such alkaline inorganic hardened bodies as concrete, wall materials, roof materials or the like. The purpose of the coating is, principally, to render the substrate waterproof, weatherproof and resistant to chemicals. Additionally, this coating is carried out considering to the aspects of both protection and esthetic appeal.

In the construction field, an aqueous, organic polymer base coating is frequently used because it offers an advantage in that the coating process is easy apply.

As these type of organic polymer base coatings, acrylic polymer or acrylic styrene copolymers have been greatly in demand and are widely used.

However, recently, a life span for a coating material which is applied on the external surface of a structure, has become longer in the market; at a minimum, a 10 year, and preferably, a semipermanent life.

When the aforementioned aqueous polymers of acrylic type polymer or acrylic styrene copolymer types are used as a top coat, recoating is necessary again within a short time. In consideration of the aforementioned demand, the weatherability of this acrylic polymer or acrylic styrene copolymer type is insufficient.

On the other hand, an organic fluoro-olefin copolymer is also available for use. This fluoro-olefin copolymer is well-known as a binder to achieve excellent weatherability and chemical resistance. An organic solvent based fluoro-olefin copolymer is on the market.

However, because this fluoro-olefin binder contain organic solvents in high quantities it presents social problem as a fire hazard and harmful pollutant.

In contrast, the manufacture of a coating material that uses an aqueous dispersion of a fluoro-olefin polymer such as polytetrafluoroethylene, polyvinylidene fluoride or polyhexafluoropropylene has been disclosed. However, this kind of coating, which uses this type of aqueous dispersion, requires high temperature heating for film forming. For example, in spite of a low molecular weight, such that the intrinsic viscosity ($\eta$) is 0.1~0.5, heating at high temperature of 180°~230° C. is still necessary for the aqueous dispersion using a copolymer of vinylidene fluoride and hexafluoropropylene disclosed in Japanese Patent Application, laid open number SHO 57-38845.

To carry out such high temperature heating at a construction site or with the forced drying equipment within a factory is practically impossible. Accordingly, it has not been possible, using the aforementioned aqueous dispersion, to manufacture a coating for industrial utilization that relies on relatively low temperature forced drying, nor to produce a coating for use in the construction field that must form a paint film at ordinary temperatures.

Additionally, because fluoro-olefin monomers are expensive raw materials, the aqueous dispersion disclosed in the above Japanese Patent Application, laid open number SHO 57-38845, which uses a copolymer solely comprising those fluoro-olefin monomers, is not satisfactory from an economic standpoint.

However, in Japanese Patent Application, laid open number SHO 61-261367, an emulsion copolymer based resin composition has disclosed for use as a coating to resolve the above various problems. This copolymer is composed from fluoro-olefin, alkyl vinyl ether and carboxylic acid vinyl ester. This resin composition can be applicable for use in protecting an alkaline inorganic hardened body. However, this resin composition is not satisfactory with respect to its adherence to the substrate, pigment dispersibility, nor to its dirt picking resistance. Additionally, when polymerization is carried out under acidic or basic conditions for the vinyl ether monomer, the vinyl ether monomer itself breaks down, and side reactions occur. For this reason, a disadvantage is presented in that reaction will only take place within a limited pH range, specifically around pH 4~8. Thus, in the art up to now, it was necessary to add a large quantity of buffer to adjust pH. As a result, a fundamental problem exists in that, in association with water, the ability of coating film obtained is not sufficiently waterproof, alkaline resistant, etc.

Additionally, in Japanese Patent Application, laid open number HEI 2-240154 and Japanese Patent Application, laid open number HEI 2-240155, a fluoro-olefin copolymer aqueous dispersion produced from a combination of fluoro-olefin, olefin, vinyl ester and/or vinyl ether and a polymerizable unsaturated acid is disclosed as a coating that can be formed a film at ordinary temperatures.

However, the coatings disclosed in these applications is not satisfactory to prevent the leaching out of the alkaline substances breeding from the inorganic construction material. Furthermore, what is disclosed in these patent applications is merely an aqueous dispersion of a fluoro-resin that does not provide sufficient resistance to the effects caused by exposure to water and alkaline conditions over a long period.

In this manner, it has not been possible to block the leaching of the alkaline substance from the surface of an alkaline inorganic hardened body such as cement mortar, cement concrete, cement asbestos or calcium silicate board when these base materials encounter water or when hydration or further hardening occurs. Furthermore, an aqueous resin coating with a wide applicability has not been made available, which is superior with respect to its ability of weatherability, water resistance, and resistance to chemicals and dirt picking resistance over long time exposure to the elements.

SUMMARY OF THE INVENTION

Accordingly, it is the object of the present invention to provide an aqueous resin to be used as a coating having a wide variety of applications. This coating forms a film that excels with respect to its prevention of the leaching out of the alkaline substance from an alkaline inorganic hardened body, and to weatherability, water resistance, and resistance to chemicals and dirt picking resistance.

To state again, it is the object of the present invention to provide an aqueous resin emulsion for a coating. The appearance of the film from the emulsion will not change greatly over time, and can prevent the degradation of the hardened body of the substrate, and additionally, may be easily and economically applied to a wide variety of applications.

As a result of efforts and research aimed at resolving the above objective is as follows. The inventors of the present invention were successful in confirming that both the external changes and the degradation over time of this coating were slight, and that the protective coating excelled in the various properties described above, when applying a coating that contains a gelled fluoride resin fine particle dispersion of a specific character to an alkaline inorganic hardened body as a top coat. Furthermore, the application of this coating was found to be convenient, therefore producing economic benefits as well. Additionally, the field of application was found to be wide.

In other words, the present invention is a gelled fluoride fine particle dispersion, the characteristic feature of which is that the fluoride resin is a gelled fine particle dispersion, and that the degree of gellation of the dispersion constitutes 20~100% by weight.

Furthermore, the present invention is a gelled fluoride fine particle dispersion, the characteristic feature of which is the utilization, in an aqueous medium and in the presence of an emulsifier, of a fluoride resin copolymerized by mixing together a monomer containing fluorine atoms, other monomers, and a crosslinking monomer selected from a hydrolizable silyl group containing a monomer and/or a cross linking monomer, which has 2 or more polymerizable unsaturated double bonds in one molecule, which comprises a mixture of 1 or 2 or more of hexadiene, octadiene, decadiene, tetradecadiene, 2-methyloctadiene, and decatriene.

It is an additional characteristic feature of the present invention that the monomer containing fluorine atoms is fluoro-olefin, and that the other monomers are ethylene, a carboxylic acid vinyl ester monomer containing a straight alkyl chain or an alkyl branch or ring alkyl structure that composed from 5 or more carbon atoms, and a monomer containing an acid group.

By adopting the use of a monomer of a specific composition, the present invention resolves the problems presented in the unsatisfactory coating ability of the prior art that arises from their use of a vinyl ether type monomer used in a copolymerization of fluoro-olefin. In other words, in the present invention, fluoro-olefin and a specific cross linking monomer were added at polymerization, causing the emulsion particles to form internal crosslinking. The present invention, as a result of the partial or complete internal gellation of the particles, has a further improved coating ability.

Additionally, it is a characteristic feature of the present invention to provide satisfactory long-term water resistance and alkaline resistance through the utilization of a carboxylic acid vinyl ester of a specific structure.

DETAILED DESCRIPTION OF THE INVENTION

The gelled fine particles according to the present invention indicates particles that have been partially or completely internally gelled through the utilization of a cross linking monomer as the essential component at polymerization. The degree of gellation is approximately 20~100% by weight, and preferably 40~100% by weight. The degree of gellation is defined by the formula (1).

$$W_2/W_1 \times 100 \tag{1}$$

$W_1$ is initial weight of dried copolymer that is made from the gelled fluoride resin fine particle dispersion.

$W_2$ is weight of the rest of treated copolymer after an acetone extraction at room temperature.

The essential components of the monomer used the present invention are a fluorine containing monomer and a cross linking monomer. The fluorine containing monomer possesses a polymerizable double bond. After polymerization, it becomes a unit, having at least one fluorine atom in the polymer backbone and/or side chain of the polymer. As an example of a monomer containing fluorine, fluoro-olefins, fluoro vinyl esters, fluoro vinyl ethers and (meth)acrylic acid esters having a fluoroalkyl group, or the like is available. Of these, fluoro-olefins are most preferable.

Accordingly, the preferable monomer combination used in the present invention is a fluoro-olefin, a carboxylic acid vinyl ester containing a straight alkyl chain or an alkyl branch or ring alkyl structure that composed from 5 or more carbon atoms, and a cross linking monomer. In particular, the preferable monomer composition for use as a coating material is 5~20% by weight ethylene (monomer weight standard, liquid conversion, as below), 40~60% by weight fluoro-olefin, 30~50% by weight carboxylic acid vinyl ester containing a straight alkyl chain or an alkyl branch or ring alkyl structure which composed from 5 or more carbon atoms, 0.5~3% by weight of a monomer containing an acid group, and 0.1~2% by weight of a crosslinking monomer.

As an example of the fluoro-olefin, vinyl fluoride, vinylydene fluoride, tetrafluoroethylene, hexafluoropropylene, 1,1,3,3,3-pentafluoropropylene, 2,2,3,3-tetrafluoropropylene, 1,1,2-trifluoropropylene, 3,3,3-trifluoropropylene, chlorotrifluoroethylene, bromotrifluoroethylene, 1-chloro-1, 2-difluoroethylene, 1,1-dichloro-2,2-difluoroethylene or the like are available.

Of these, a fluoro-olefin selected from hexafluoropropylene, chlorotrifluorethylene, or vinylydene fluoride is preferable. In consideration of reaction control at the polymerization, chlorotrifluorethylene is most preferable.

As the carboxylic acid vinyl ester containing a straight alkyl chain or alkyl branch or ring alkyl structure that composed from 5 or more carbon atoms, vinyl pivalate, vinyl caproate, vinyl versarate (vinyl neononanate, vinylneodecanate), vinyl laurate, vinyl stearate, vinyl cyclohexane carboxylate, vinyl p-t-butyl benzoate and such others as "VEOBA" (a vinyl ester manufactured by Shell Chemical, Co.) is available. The carboxylic acid corresponding to the vinyl ester of carboxylic acid has, as above, a straight alkyl chain or an alkyl branch or ring alkyl ring alkyl structure that composed from carbon chain of 5 or more carbon atoms.

Such structure improves the weatherability, the water resistance, the resistance to chemicals etc., of the film obtained from the dispersion. Moreover, if the number of the carbon atoms within the acid is 6 or more, this effect becomes even more obvious. Because the carboxylic acid vinyl ester containing a straight alkyl chain or an alkyl branch or ring alkyl structure that composed from 5 or more carbon atoms has a bulky alkyl group, the water repellency of the film obtained from the dispersion is improved, and then the hydrolysis of the ester bond by high temperature water or alkalis is suppressed. Accordingly, due to the use of this type of monomer, resistance to boiling water and antialkaline resistance at high temperatures over the long time can be improved. On the other hand, while the film obtained using a vinyl ester from a carboxylic acid of less than 5 carbon atoms does also have good weatherability, it is lacking in long term water resistance and alkaline resistance.

The monomer containing the acid group is exemplified by mono- or di-carboxylic acid; such mono-carboxylic acid monomer as (meth)acrylic acid, crotonic acid; or such dicarboxylic acid monomer as maleic acid, fumaric acid, itaconic acid or citraconic acid, maleic anhydride, itaconic anhydride; or hydroxyalkylester monocarboxylic acid containing an unsaturated group, for example, an adduct of glycol and a monomer containing an acid hydride group such as maleic anhydride, itaconic anhydride. Of these, crotonic acid and iraconic acid are preferable from the aspect of copolymerization.

The objective of introducing an acid group containing monomer is to improve dispersion stability, and to improve the adherence to the substrate material ultimately applied.

As an example of the cross linking monomer, monomers having two or more unsaturated polymerizable groups within the molecule, such as hexadiene, octadiene, decadiene, tetradecadiene, 2-methyl-octadiene, decatriene, ethylene glycol di(meth)acrylate, propylene glycol di(meth)acrylate, trimethylol propane tri(meth)acrylate, diarylphthalate, and monomers having hydrolyzable silyl group containing monomers, such as vinyl triethoxysilane, γ(meth)acryloyloxypropyltrimethoxysilane γ(meth)acryloyloxypropylmethyldimethoxysilane γ(meth)acryloyloxypropyltriethoxysilane γ(meth)acryloyloxypropylmethyl diethoxysilane, tris(2-methoxyethoxy)vinylsilane are available.

Preferable among these cross linking monomers from the aspect of obtaining a stable aqueous dispersion is a monomer of 1 or 2 or more of hexadiene, octadiene, decadiene, tetradecadiene, 2-methyl-octadiene, decatriene, and/or a hydrolizable silyl group containing monomer such as vinyltriethoxysilane, γ(meth)acryloyloxypropyltrimethoxysilane γ(meth)acryloyloxypropylmethyldimethoxysilane γ-(meth)acryloyloxypropyltriethoxysilane, γ-(meth)acryloyl oxypropylmethyldiethoxysilane tris(2-methoxyethoxy)vinylsilane.

The objective of introducing a cross linking monomer is to improve properties such as water resistance, alkaline resistance and solvent resistance, and to achieve a polymer film having tenacity at that polymer's glass transition temperature or below.

These monomers are selected and used while keeping under consideration the glass transition temperature of the copolymer ultimately obtained, the minimum film forming temperature for the coating, and the like.

The principal components comprising the structure of the present invention were given above. However, no hindrance is presented by other monomers in combination with or in place of these in quantities within the limits in which the capabilities of the coating obtained using an aqueous dispersion of the present invention are not compromised—specifically, limits not exceeding approximately 20% by weight on total monomers.

As an example of these other monomers, vinyl chloride, vinylidene chloride, olefins such as propylene, butane-1, or the like, or any of the derivatives of (meth)acrylic acid, or the like are available.

Next, an emulsifier is employed in order to emulsify each of the above monomers in an aqueous medium, and so that the coating capabilities are fully displayed in the ultimate application. As the emulsifier, a non-fluorine containing anion emulsifier and/or a non-fluorine containing nonion emulsifier is preferably employed. The following are offered as examples.

The non-fluorine containing anion emulsifier (containing an anion emulsifier with a polymerizable unsaturated double bond) is exemplified by an alkyl benzene sulfonate salt, alkyl sulfate salt, poly(oxyethylene) alkyl phenolsulfate salt, styrene sulfonate, vinyl sulfate and their derivatives. The salts mentioned here indicate salts with hydroxides of alkali metals, or salts with such volatile bases as ammonia or triethyl amine. Of these, a compound containing one or two or more of (substituted) alkyl (benzene) sulfonate salt, or vinyl sulfonate salt is preferable.

The non-fluorine containing nonionic emulsifier (containing a nonion emulsifier with a polymerizable unsaturated double bond) is exemplified by poly(oxyethylene) alkyl phenolether, poly(oxyethylene) alkylether, polyoxyethylene higher fatty acid ester, ethylene oxide propylene oxide block copolymer, and their derivatives. Of these, a compound of one or two or more of these is used. Of these, considering to the properties of the film that is ultimately obtained, poly-(oxyethylene) (substituted) alkyl(phenol)ether is preferable.

As for the quantity of these emulsifier used, combining the anion type and nonion type emulsifiers, weight ratios in the range of 0.5~10% of the total monomer weight are appropriate.

Additionally, in combination with these, such water soluble oligomers from polycarboxylic acid or sulfonate or their salts, and such water soluble macromolecules as polyvinyl alcohol, hydroxethylcellulose, etc., can be used as a protective colloid.

Next, what is meant by "non-fluorine containing" will be explained. Although polymerization in an aqueous medium of fluoro-olefin is carried out using a fluorine containing emulsifier, in the prior art, due to the use of these emulsifiers containing fluorine atoms, the particle surfaces become a comparatively low energy condition. As a result, when the dispersion obtained in the prior art is coated upon a material, the adhesion to the material is not satisfactory. In the present invention, to improve this defect, a polymerization with a "non-fluorine containing" emulsifier is preferable. This does not, however, hinder the concurrent use of a fluorine containing emulsifier such as represented by perfluoro octanoic acid salt.

The gelled fluoride resin fine particle dispersion of the present invention may be obtained by the polymerization of the aforementioned monomers in an aqueous medium in the presence of a emulsifier.

As for the polymerization initiator used at the polymerization stage, provided that it is a substance generally used in an emulsion polymerization, no particular limitations are present. As an example, aqueous inorganic peroxides like hydrogen peroxide; persulfate salt like ammonia persulfate, potassium persulfate and sodium persulfate; organic peroxides like cumene hydroperoxide, benzolyperoxide, and t-butylhydroperoxide; azo type initiators like azobisisobutyronitrile, and azobisisocyanovaleric acid are available, and may be used singularly or in combination. As the quantity used, a weight ratio in the range of 0.1~2% of the total weight of the monomer is preferable. Additionally, the so called redox polymerization method, through the combined use of these polymerization initiators (except azo type initiators), a metal ion and a reducing agent is acceptable.

As an example of the reducing agent, sodium bisulfite, sodium meta bisulfite, sodium bithiosulfate, sodium hydrosulfite, sodium formaldehyde sulfoxylate, and reducing sugars are available. Furthermore, as the metal ion, to give a few examples, copper sulfate, ferric chloride, ferric sulfate and silver nitrate are available.

Furthermore, any of the variety of chain transfer agents may be used.

In an aqueous medium and in the presence of an emulsifier, the monomers may be introduced into a reaction vessel to polymerize. Then the gelled fluoride resin fine particle dispersion can be obtained. As the aqueous medium, ion exchanged water is preferable. The monomers may be dropped in as is, or in an emulsified state. Additionally, the introducing of the monomers may be carried out all at once, in portions or continuously. The preferable conditions for polymerization are at a gage pressures of approximately 1 kg/cm$^2$~100 kg/cm$^2$ and at a reaction temperature of approximately 50°~150° C. Depending on the situation, polymerization can be carried out at pressure greater than the above, or at temperatures lower than these. For the ratio between the total monomer quantity and the aqueous medium, it may be set up that the final solid content constitutes 1~60% by weight, with the preferable range being 15~55% by weight. Furthermore, at emulsion polymerization, to enlarge or control the diameter of the particles, the seed polymerization method wherein polymerization is performed while in the presence of emulsion particles in an aqueous medium, may be used.

It is preferable that, in the aqueous medium used here, the quantity of water (fundamentally, ion exchanged water) to be 70% or more of the total aqueous medium. The remaining 30% or less may constitute the organic solvent.

The organic solvent mentioned herein is not particularly limited, and, provided that it is a common organic solvent, any kind may be used. Examples include such organic solvents as the ketone types, such as acetone, methylethylketone, and methylamylketone; ester types, such as ethyl acetate, and butyl acetate; aromatic hydrocarbon types, such as benzene, toulene, and xylene; aliphatic hydrocarbon types, such as hexane and heptane; alcohol types, such as methanol, ethanol, isopropanol, and butanol; halogenated organic solvents such as carbon tetrachloride, methylene dichloride, including fluorine and/or chlorine containing poly-halogenated hydrocarbon solvents such as hexafluoro isopropanol. Of these, the use of those organic solvents having a strong affinity to water, or having a great ability to dissolve ethylene and fluoro-olefin in an aqueous medium, is preferable. In other word, as particularly preferable organic solvents such hydrophilic solvents as acetone, methylethylketone, methanol, ethanol, and isopropanol; and fluorine and/or chlorine containing poly-halogenated hydrocarbon solvents such as hexafluoro isopropanol, and the like are available.

Because, in some cases, carbon tetrachloride, heptane, etc., are functioned as a telogen, it is necessary to take caution with the quantity used when adjusting the molecular weight.

The polymerization reaction can be carried out in a pH range of approximately 1.0~6.0. The pH may be adjusted using such pH buffer agents as disodium phosphate, borax, sodium bicarbonate, ammonia or the like. At higher pHs, defects arise in the water resistance and alkaline resistance properties of a film that has been applied as described above.

While the gelled fluoride resin fine particle dispersion of the present invention can be obtained in the above manner, some portion of the unreacted monomer remains in a gaseous form in the emulsion particle just after the completion of the reaction. The majority of this remainder is unreacted fluoro-olefino The following procedure is carried out to remove the remaining fluoro-olefin without destroying the emulsion particles. In other words, following neutralization of all or part of the acid group of the acid group containing monomer that has been changed to a polymer by a base compound, the unreacted monomer is removed. Or the unreacted monomer is removed following the addition of a silicon and/or mineral oil type compound to the reaction mixture.

The base compound can be exemplified by inorganic alkaline metal hydroxides of such as sodium hydroxide, potassium hydroxide, or by such organic amines as triethylamine, or by ammonia. Of these, volatile bases such as organic amines like triethylamine, or ammonia are preferable.

The conventional aqueous defoaming agents already available on the market may be used as the silicon and/or mineral oil type compound.

As a method of removing unreacted monomer, the unreacted gaseous monomer may be removed at room temperature, or at temperatures under 100° C., under conditions of normal and reduced pressure, or a steam distillation method may be employed. At this point, it is also possible to proceed with the removal of unreacted gaseous monomer by the bubbling of such inert gas as nitrogen gas in the reaction mixture.

When the gelled fluoride resin fine particle dispersion obtained according to the present invention is converted to a state containing no cross linking monomers, its number average molecular weight corresponds to 5,000~1,000,000, the weight average molecular weight also corresponds to 10,000~3,000,000. The minimum film forming temperature of the dispersion according to the present invention is approximately 10°~60° C. Additionally the particle diameter is approximately 0.02~0.5 microns.

The gelled fluoride resin fine particle dispersion obtained according to the method of the present invention can combine with such inorganic pigments as titanium dioxide, mica, talc, clay, sedimented barium sulfonate, silica powder, calcium carbonate, iron oxide, zinc oxide, aluminum powder, or carbon black, with such organic pigments as the azo types, phthalocyanine types, quinacridon types, with plastic pigments, or with pigment dispersions that have been formed by dispersing these in water with an emulsifier or with a dispersant. These may be selected and used in response to the form ultimately desired.

Furthermore, any of the variety of additives necessary for coating formulation, for example, dispersants, wetting agents, coalescents, thickeners, thixotropic agents, ultraviolet absorbers, antioxidant agents, water repellants, antifreezing agents, biocides, defoaming agents and the like can be selected and used giving consideration to the properties of the film to be obtained.

Moreover, although there are no particular limitations to the application method used when applying the gelled fluoride resin fine particle dispersion, or an aqueous paint composition containing the dispersion and a pigment, etc., to an inorganic alkali hardened body as disclosed above, preferable methods are exemplified by the brush method, roller method, spray method, roll coater method, or the showering method.

In the present invention, the inorganic alkali hardened body indicates a hardened body that is cured by the hydrated crystallization of an alkali compound such as, for example, cement mortar, cement concrete, ALC, asbesto-concrete, ligneous cement board, or calcium silicate board, or the like, and is used, for example, as a concrete body, wall material or roof material.

To utilization at a construction site, the coating composition, in which the minimum film forming temperature by the addition of the usual coalescents is 0° C. or lower, is preferable. As the application method at this point, any of the methods such as the brush method, roller method, spray method or the like may be used. Moreover, for such roof and wall materials as tile, in a factory line where the painting procedure is applied, heat forced drying is generally carried out. According to this method, the minimum film forming temperature may be set in response to the conditions necessary for drying, and under the condition wherein a coalescent has been added. In this case, the minimum film forming temperature is approximately 60° C. or lower, and it is preferable to select and use a paint that will form at 50° C. or lower. As the application method in this case, roll coating, or application by rolling, spraying or showering, or the like is applicable.

Moreover, the gelled fluoride resin fine particle dispersion, or the aqueous paint composition containing the aforementioned dispersion and a pigment or the like, can be applied to the alkaline inorganic hardened body directly in a single coating, or in multilayer coatings. If a paint, which binder has a good alkaline resistance just like the acrylic types, acrylic styrene copolymer types, acrylic urethane types, silicon acrylic types, epoxy types, urethane types or silicon types, is used as a primer, the dispersion of the present invention, or an aqueous paint composition of it may be applied as a topcoat of this primer. In such a coating system, an improvement in the overall weatherability can be achieved.

For any of the various coating systems that may be employed, the appropriate thickness of the dried coating film comprising the gelled fluoride resin fine particle dispersion of the present invention as the essential component, or comprising an aqueous composition containing the above dispersion of along with a pigment, etc., is 5 microns or more.

When the thickness of the coating layer is less than 5 microns, defects in the long term durability of the coating film frequently arise.

Accordingly, the utilization of the gelled fluoride resin fine particle dispersion of the present invention provides for the formation of a protective coating for an alkaline inorganic hardened body, superior with respect to its excellent weatherability, and its water resistance, alkaline resistance and dirt picking resistance.

The material that is to be coated with the composition containing the obtained gelled fluoride resin fine particle dispersion may be metal, plastic, wood, glass, paper, textile, or the like. As a coating method, applications by brush, spray, roll or flow coater painting, or by dipping are all applicable. After coating, in addition to extending the setting time if necessary, high heat forced drying or ambient-temperature drying may be used to obtain the coating film as conditions required. In the case of high heat forced drying, drying may be carried out for an optional period at 60°~200° C.

The gelled fluoride resin fine particle dispersion obtained according to the present invention, because of its characterizing features of high weatherability, resistance to chemicals and pollutants, and long term resistance to hot water and alkalines at high temperatures, can be used as an aqueous coating composition for interior or exterior use, or can be used as a coating or treating agent for metal, plastic, wood, inorganic material, paper, textile, or the like.

EXAMPLES

What follows below is an explanation of the present invention through the provision of representative examples. Moreover, "part" shall be taken herein to indicate "parts by weight".

Example 1

(synthesis of gelled fluoride resin fine particle dispersion)

A 2 liter stainless steel, pressure proof reaction vessel (autoclave) equipped with a stirring apparatus, nitrogen induction tube, temperature gauge and temperature regulation was purged by nitrogen gas, and 800 grams of deionized water, 20 grams of sodium dodecylbenzenesulfonate, 20 grams of polyoxyethylene nonylphenyl ether, and 10 grams of borax as a pH buffer, were added and dissolved. Next, 400 grams of vinyl neononanate, 15 grams of crotonic acid, 15 grams of decadiene and 500 grams of chlorotrifluoroethylene which had been liquefied were introduced into the vessel. Next, ethylene gas was introduced until a pressure of 15 kg/cm$^2$ was reached. The temperature was raised until the internal temperature of the autoclave reached 80° C. At that time, the ethylene gas was introduced to adjust until the internal pressure of the reaction mixture was approximately 30 kg/cm$^2$. Next, at the same temperature, an initiator solution in which 5 grams of potassium persulfate had been dissolved in 200 grams of deionized water was introduced by pressure for three hours within a reaction vessel. Following the addition of the initiator solution, the reaction mixture was maintained for 10 hours at the same temperature and the polymerization was allowed to proceed. The reaction proceeded at a pH of 3.5. Although the pressure of the reaction mixture descended accompanying monomer consumption during the reaction, the pressure of the reaction mixture was maintained at 30 kg/cm$^2$ by the periodic introduction of ethylene. Following the completion of the reaction, the obtained reacted dispersion was cooled to room temperature. A 14% aqueous ammonia solution was added to the dispersion to adjust a pH of approximately 7.5. Then, 1 gram of 5% aqueous dispersion of a silicon type defoaming agent (Nopco 8034L produced by Sun Nopco) was added, and stirred well. Then, the unreacted gas was gradually removed from the reaction mixture, and the pressure of the system was released to atmospheric pressure. Then the unreacted gas dissolved in the dispersion was removed under reduced pressure.

The obtained dispersion was a water reducible, white colored dispersion, the solid content of which was 48.5%, having a of pH 7.2, a minimum film forming temperature of 42° C., and an average particle diameter of 0.08 microns. This fine dispersion will be referred to as (A-1) hereafter.

A compositional analysis of (A-1) was performed through elemental analysis, ion chromatographic analysis, infrared spectroscopy, and pyrolytic gas chromatography. Its composition is analyzed of 7.4% by weight ethylene, 47.3% by weight fluoro-olefin, 42.1% by weight of vinyl ester type monomer of a straight alkyl chain or a branched or ringed carboxlyic acid having 5 or more carbon atoms, 1.6% by weight of a monomer containing an acid group, and 1.6% by weight of a crosslinking monomer, with a gellation degree of 75% by weight.

Example 2

(synthesis of gelled fluoride resin fine dispersion)

Potassium persulfate and a reducing agent were used a catalyst, the reaction temperature was set to 65° C., and, other than the addition of 2 grams of a 0.05% aqueous solution of ferric chloride at the initial step, synthesis was performed in the same manner as in Example 1.

Potassium persulfate solution was prepared by dissolving 5 grams of potassium persulfate in 100 grams of deionized water.

The reducing agent was prepared by dissolving 5 grams of sodium formaldehyde sulfoxylate in 100 grams of deionized water.

The obtained dispersion was a water reducible, white colored dispersion, the solid content of which was 48.0%, having a pH of 7.3, a minimum film forming temperature of 43° C., and an average particle diameter of 0.08 microns. This will be referred to as (A-2) hereafter.

A compositional analysis of (A-2) was performed through elemental analysis, ion chromatographic analysis, infrared spectroscopy, and pyrolytic gas chromatography. Its composition is analyzed of 7.2% by weight ethylene, 48.5% by weight fluoro-olefin, 41.2% by weight of a vinyl ester type monomer of a straight alkyl chain or a branched or ringed carboxlyic acid having 5 or more carbon atoms, 1.5% by weight of a monomer containing an acid group, and 1.6% by weight of a crosslinking monomer, with a gellation degree of 87% by weight.

Example 3

(synthesis of a gelled fluoride resin fine particle dispersion)

With the exception of using the below as starting materials, synthesis was carried out in the same manner as in Example 1.

deionized water 800 grams
  sodium dodecylbenzenesulfonate 20 grams
  polyoxyethylene nonyl phenyl ether 20 grams
  sodium phosphate 10 grams
  vinyl neodecanate 340 grams
  vinyl p-t-butyl benzoate 50 grams
  vinyl neononanate 10 grams
  crotonic acid 15 grams
  vinyl triethoxy silane 15 grams
  chlorotrifluoroethylene (liquefied) 500 grams (Ethylene was introduced until a pressure of 15 kg/cm$^2$ was attained, and during the reaction the pressure in the system was maintained at 30 kg/cm$^2$.)

The initiator solution was prepared of the following procedure.

potassium persulfate 5 grams
  deionized water 200 grams

The obtained dispersion was a water reducible, white colored dispersion, the solid content of which was 48%, having a pH of 7.2, a minimum film forming temperature of 30° C., and an average particle diameter of 0.09 microns. This will be referred to as (A-3) hereafter.

A compositional analysis of (A-3) was performed through elemental analysis, ion chromatographic analysis, infrared spectroscopy, and pyrolytic gas chromatography. Its composition is analyzed of 5.6% by weight ethylene, 52.1% by weight fluoro-olefin, 39.2% by weight of vinyl ester type monomer of a straight alkyl chain or a branched or ringed carboxlyic acid having 5 or more carbon atoms, 1.5% by weight of a monomer containing an acid group, and 1.6% by weight of a crosslinking monomer, with a gellation degree of 63% by weight.

Example 4

(synthesis of gelled fluoride resin fine particle dispersion)

With the exception of the substitution of 770 grams of deionized water for 800 grams of deionized water, and the use of 30 grams of hexafluoroisopropanol, synthesis was carried out in the same manner as in Example 1.

In place of the silicon type compound, a mineral oil type defoaming agent (Nopco NDW produced by Sun Nopco Manufacturing) was used when removing the unreacted gas. Hexafluoroisopropanol was also removed. The obtained dispersion was a water reducible, white colored dispersion, the solid content of which was 50%, having a pH of 7.0, a minimum film forming temperature of 48° C., and an average particle diameter of 0.15 microns. This will be referred to as (A-4) hereafter.

A compositional analysis of (A-4) was performed through elemental analysis, ion chromatographic analysis, infrared spectroscopy, and pyrolytic gas chromatography. Its composition was analyzed of 8.2% by weight ethylene, 51.9% by weight fluoro-olefin, 37% by weight of a vinyl ester type monomer of a straight alkyl chain or a branched or ringed carboxlyic acid having 5 or more carbon atoms, 1.5% by weight of a monomer containing an acid group, and 1.4% by weight of a crosslinking monomer, with a gellation degree of 82% by weight.

Reference Example 1

Other than removing decadiene from Example 1, a dispersion not containing any crosslinking monomer was obtained, being produced in the same manner as in Example 1. It will be referred hereafter as (B-1).

(B-1) was coagulated by adding salts according to the usual method, and the polymer portion only was obtained. Next, the free emulsifier was extracted with deionized water and, following drying, was dissolved in tetrahydrofuran. The molecular weight of the polymer, which is calibrated with standard polystyrene polymer was measured by means of gel permeation chromotography. The result obtained was a number average molecular weight of 157,000, and a weight average molecular weight of 478,000. This value corresponds to the molecular weight of (A-1) without using the crosslinking monomer. The degree of gellation was approximately 0% by weight.

Reference Example 2

Other than removing decadiene from Example 3, a dispersion not containing any crosslinking monomer was obtained, being produced in the same manner as in Example 3. It will be referred hereafter as (B-2).

(B-2) was coagulated by adding salts according to the usual method, and the polymer portion only was obtained. Next, the free emulsifier was extracted with deionized water and, following drying, was dissolved in tetrahydrofuran. The molecular weight of the polymer, which is calibrated with standard polystyrene polymer, was measured by means of gel permeation chromotography. The result obtained was a number average molecular weight of 207,000, and a weight average molecular weight of 634,000. This corresponds to the molecular weight of (A-3) without using the crosslinking monomer. The degree of gellation was approximately 0% by weight.

Example 5

(synthesis of the gelled fluoride resin fine particle dispersion of the present invention utilizing a carboxylic acid vinyl ester type monomer having less than 5 carbon atoms)

A 2 liter stainless steel, pressure proof reaction vessel (autoclave) equipped with a stirring apparatus, nitrogen induction tube, temperature gauge and temperature regulation device was purged by nitrogen gas, and 800 grams of deionized water, 20 grams of sodium dodecylbenzenesulfonate, 20 grams of polyoxyethylene nonylphenyl ether, and 10 grams of borax as a pH buffer, were added and dissolved. Next, 400 grams of vinyl acetate, 15 grams of crotonic acid, 15 grams of decadiene and 500 grams of chlorotrifluoroethylene which had been liquefied were introduced into the vessel. Next, ethylene gas was introduced until a pressure of 15 kg/cm$^2$ was reached. The temperature was raised until the internal temperature of the autoclave reached 80° C.

At that time, the ethylene gas was introduced to adjust until the internal pressure of the reaction mixture was approximately 30 kg/cm$^2$. Next, at the same temperature, an initiator solution in which 5 grams of potassium persulfate had been dissolved in 200 grams of deionized water was introduced by pressure for three hours within a reaction vessel. Following the addition of the initiator solution, the reaction mixture was maintained for 10 hours at the same temperature and the polymerization was allowed to proceed. The reaction proceeded at a pH of 3.5. Although the pressure of the reaction mixture descended accompanying monomer consumption during the reaction, the pressure of the reaction mixture was maintained at 30 kg/cm$^2$ by the periodic introduction of ethylene. Following the completion of the reaction, the obtained reacted dispersion was cooled to room temperature. A 14% aqueous ammonia solution was added to the dispersion to adjust a pH of approximately 7.5. Then, 1 gram of 5% aqueous dispersion of a silicon type defoaming agent (Nopco 8034L produced by Sun Nopco) was added, and stirred well. Then, the unreacted gas was gradually removed from the reaction mixture, and the pressure of the system was released to atmospheric pressure. The unreacted gas dissolved in the dispersion was removed under reduced pressure. Then the obtained dispersion was a water reducible, white colored dispersion, the solid content of which was 48%, having a pH of 7.2, a minimum film forming temperature of 42° C. and an average particle diameter of 0.08 microns. This will be referred to as (A-5) hereafter.

A compositional analysis of (A-5) was performed through elemental analysis, ion chromatographic analysis, infrared spectroscopy, and pyrolytic gas chromatography. Its composition was analyzed of 7.4% by weight ethylene, 47.3% by weight fluoro-olefin, 42.1% by weight of vinyl ester type monomer of carboxlyic acid having less than 5 carbon atoms, 1.6% by weight of a monomer containing an acid group, and 1.6% by weight of a cross linking monomer, with a gellation degree of 68% by weight.

Reference Example 3

Following the completion of the reaction of Example 1, the reaction mixture was cooled to room temperature. After cooling, without addition of 14% aqueous ammonium, there was a large quantity of an aggregated emulsion generated, and the sample could not be used as a coating composition.

Reference Example 4

Following the completion of the reaction of Example 1, the reaction mixture was cooled to room temperature. After cooling, without addition of a silicon type defoaming agent (Nopco 8034L produced by Sun Nopco Manufacturing), considerable bubbling from the emulsion particles occurred with the result that there was a large quantity of an aggregated emulsion generated, and the sample could not be used as a coating composition.

Application Example (formulation of aqueous coating composition)

Each of the gelled fluoride resin fine particle dispersion obtained in examples 1~5 (resin number A-1~A-5) and the dispersion obtained in reference examples 1~2 (resin member B-1~B-2) was diluted to a 45% solid content, texanol was added in the amount of 2% was added as the coalescent, and an aqueous composition was obtained. Each of the obtained compositions was dip coated to a slate plate as a base material and dried for 20 minutes at 60° C. Next, these were allowed to dry at room temperature for 7 days, and each of the following experiments was performed. Additionally, in test (8), testing long term resistance to boiling water at high temperature, a glass plate was used as the base material.

Experimental results are shown in table 1.

The standards showing the experimental headings and results of the table 1 are as follows below.

(1) Example Number:
Indicates corresponding example or comparative example.

(2) Resin Number:
Indicates the number of the fluoride resin aqueous dispersion corresponding to the number of the experimental or comparative sample used. For B-3 and B-4, a large quantity of an aggregated substance was generated and no values were obtainable.

(3) Water Resistance:
Following soaking in tap water for 2 months, a visual inspection was made of the condition of the coating. Those samples which displayed no change were indicated by ⊙, and those for which blistering, peeling, or blanching were observed were indicated by X.

(4) Alkaline Resistance:
After soaking in a 2% NaOH aqueous solution saturated with Ca(OH)$_2$ for 2 months, a visual inspection was made of the condition of the coating. Those samples which displayed no change were indicated by ⊙, and those for which blistering, peeling, or blanching were observed were indicated by X.

(5) Acid Resistance:
Following soaking in a 0.2% aqueous sulfuric acid solution for 1 month, a visual inspection was made of the condition of the coating. Those samples which displayed no change were indicated by ⊙, and those for which blistering, peeling, or blanching were observed were indicated by X.

(6) Accelerated Weatherability:
Following 3000 hours exposure by a Dew Panel Light Controlled Weather Meter, a visual inspection was made of the condition of the coating. Those samples which displayed no change were indicated by ⊙, and those for which blistering, peeling, or blanching were observed were indicated by X.

(7) Adherence:

A cross-cut adhesion test was performed. Cellophane adhesive tape was peeled off the sample and a visual inspection of the degree of flaking was made. Those samples which displayed no change were indicated by ⊙, and those for which peeling was observed were were indicated by X.

(8) Long Term Resistance to Boiling Water at High Temperature:

Using a pressure cooker, the base material was exposed for 2 weeks to high temperature steam at 140° C. and 1.8 kg/cm$^2$, and following this, a visual inspection was made of the condition of the coating. Those samples which displayed no change were indicated by ⊙, and those for which blistering, peeling, or blanching were observed were indicated by X.

The present experiments correspond to accelerated durability tests on the water resistance and resistance to boiling water of the coating over an extended period.

(9) Alkaline Resistance Test at High Temperatures:

Following soaking for 2 weeks in a 2% aqueous solution of NaOH saturated with Ca(OH)$_2$ at 50° C., a visual inspection was made of the condition of the coating. Those samples which displayed no change were indicated by ⊙, and those for which blistering, peeling, or blanching were observed were indicated by X.

The present experiment corresponds to accelerated testing on the prolonged alkaline resistance of a coating which has been applied to an alkaline inorganic hardened body.

(10) Efflorescence when the alkaline substrates were cured by steam:

A coated panel (coated on a slate panel) was placed in a pressure vessel, and high pressure steam of 140° C., 5 kg/cm$^2$ was introduced. The sample was maintained for 12 hours at the same temperature and same pressure. Those samples in which calcium salt, effloresced from the slate panel, had been deposited to the coating surface and had turned white were indicated by X, those samples which evidenced only patchy whiterling were indicated by Δ, and those samples which were observed no changes at all in external appearances were indicated by ⊙.

The films obtained each of the gelled fluoride resin fine particle dispersion obtained in the present invention showed completely satisfactory results in experiments 3–7. In the case where a vinyl ester type monomer of a carboxlyic acid having a straight alkyl chain or a branched or ringed alkyl structure having 5 or more carbon atoms was used as the comonomer, excellent properties were displayed in each of experiments 3–10.

The gelled fluoride resin fine particle dispersion of the present invention as above not only has superior efficacy as a sealant against alkaline substances in the case where a hardened body comes in contact with water or heat, or even in the case where the hardened body becomes hydrate, but also, in the case where a vinyl ester type monomer of a carboxlyic acid having a straight alkyl chain or a branched or ringed alkyl structure having 5 or more carbon atoms is utilized as a comonomer, displays no degradation under conditions of prolonged exposure to caustics or high temperatures. With the gelled fluoride resin fine particle dispersion of the present invention a highly serviceable, protective layer having excellent weatherability and superior alkaline resistance and dirt picking resistance over long term outside exposure can be created.

TABLE I

| | | APPLICATION EXAMPLE 1 | APPLICATION EXAMPLE 2 | APPLICATION EXAMPLE 3 | APPLICATION EXAMPLE 4 | COMPARATIVE EXAMPLE 1 |
|---|---|---|---|---|---|---|
| ① | EXAMPLE NUMBER | EXAMPLE 1 | EXAMPLE 2 | EXAMPLE 3 | EXAMPLE 4 | REFERENCE EXAMPLE 1 |
| ② | RESIN NUMBER | A-1 | A-2 | A-3 | A-4 | B-1 |
| ③ | WATER RESISTANCE | ⊙ | ⊙ | ⊙ | ⊙ | ⊙ |
| ④ | ALKALINE RESISTANCE | ⊙ | ⊙ | ⊙ | ⊙ | ⊙ |
| ⑤ | ACID RESISTANCE | ⊙ | ⊙ | ⊙ | ⊙ | ⊙ |
| ⑥ | ACCELERATED WEATHERABILITY | ⊙ | ⊙ | ⊙ | ⊙ | ⊙ |
| ⑦ | ADHERENCE | ⊙ | ⊙ | ⊙ | ⊙ | ⊙ |
| ⑧ | LONG TERM RESISTANCE TO BOILING WATER AT HIGH TEMPERATURE | ⊙ | ⊙ | ⊙ | ⊙ | x WHITENING |
| ⑨ | ALKALINE RESISTANCE TEST AT HIGH TEMPERATURE | ⊙ | ⊙ | ⊙ | ⊙ | x WHITENING |
| ⑩ | EFFLORESCENCE WHEN THE ALKALINE SUBSTRATES WERE CURED BY STEAM | ⊙ | ⊙ | ⊙ | ⊙ | x |

| | | COMPARATIVE EXAMPLE 2 | APPLICATION EXAMPLE 5 | COMPARATIVE EXAMPLE 3 | COMPARATIVE EXAMPLE 4 |
|---|---|---|---|---|---|
| ① | EXAMPLE NUMBER | REFERENCE EXAMPLE 2 | EXAMPLE 5 | REFERENCE EXAMPLE 3 | REFERENCE EXAMPLE 4 |
| ② | RESIN NUMBER | B-2 | A-5 | B-3 | B-4 |
| ③ | WATER RESISTANCE | ⊙ | ⊙ | — | — |
| ④ | ALKALINE RESISTANCE | ⊙ | ⊙ | — | — |
| ⑤ | ACID RESISTANCE | ⊙ | ⊙ | — | — |

TABLE I-continued

| | | | | |
|---|---|---|---|---|
| ⑥ ACCELERATED WEATHERABILITY | ⊚ | ⊚ | — | — |
| ⑦ ADHERENCE | ⊚ | ⊚ | — | — |
| ⑧ LONG TERM RESISTANCE TO BOILING WATER AT HIGH TEMPERATURE | x WHITENING | x WHITENING | — | — |
| ⑨ ALKALINE RESISTANCE TEST AT HIGH TEMPERATURE | x WHITENING | x WHITENING | — | — |
| ⑩ EFFLORESCENCE WHEN THE ALKALINE SUBSTRATES WERE CURED BY STEAM | x | Δ | — | — |

What is claimed is:

1. An aqueous dispersion of particles of gelled fluoride resin prepared from a fluoro-olefin, other monomers and a crosslinking monomer, characterized in that said fluoride resin is obtained by mixing together and copolymerizing, in an aqueous medium and in the presence of an emulsifier, a fluoro-olefin, a second monomer, and, as a crosslinking monomer, a monomer containing a hydrolyzable silyl group.

2. The aqueous dispersion according to claim 1, characterized in that the degree of gelation of said gelled resin is 20 to about 100% by weight.

3. The aqueous dispersion according to claim 1 wherein said crosslinking monomer further comprises at least one of hexadiene, octadiene, decadiene, tetradecadiene, 2-methyloctadiene, and decatriene.

4. The aqueous dispersion according to claim 1, characterized in that said monomer containing said hydrolyzable silyl group is at least one of vinyl triethoxysilane, γ-(meth)acryloyloxypropyltrimethoxysilane, γ-(meth)acryloyl oxypropyl methyl dimethoxysilane, γ-(meth)acryloyl oxypropyl triethoxy silane, γ-(meth)acryloyl oxypropyl methyl diethoxy silane, and tris(2-methoxyethoxy) vinylsilane.

5. The aqueous dispersion according to claim 3, characterized in that said second monomer comprises ethylene, a vinyl ester monomer of a carboxylic acid that has a straight alkyl chain or an alkyl branch or ring alkyl structure that contains 5 or more carbon atoms, and a monomer containing an acid group.

6. The aqueous dispersion according to claim 1, characterized in that said second monomer comprises ethylene, a vinyl ester monomer of a carboxylic acid that has a straight alkyl chain or an alkyl branch or ring alkyl structure that contains 5 or more carbon atoms, and a monomer containing an acid group.

7. The aqueous dispersion according to either claim 5 or claim 6, characterized in that said dispersion is obtained by copolymerizing 40 to about 60% by weight of said fluoro-olefin, 5 to about 20% by weight of said ethylene, 30 to about 50% by weight of said vinyl ester monomer of a carboxylic acid which has a straight alkyl chain or an alkyl branch or ring alkyl structure that contains 5 or more carbon atoms, 0.5 to about 3% by weight of said monomer containing an acid group, and 0.1 to about 2% by weight of said cross linking monomer.

8. The aqueous dispersion according to either claim 5 or claim 6, characterized in that said fluoro-olefin is at least one of chlorotrifluoroethylene, vinylidene fluoride, and hexafluoropropylene.

9. The aqueous dispersion according to either claim 5 or claim 6, characterized in that said vinyl ester monomer of a carboxylic acid that has a straight alkyl chain or an alkyl branch or ring alkyl structure that contains 5 or more carbon atoms is at least one of vinyl pivalate, vinyl caproate, vinyl versatate, vinyl laurate, vinyl stearate, and vinyl cyclohexane carboxylate.

10. The aqueous dispersion according to either claim 5 or claim 6, characterized in that said monomer containing an acid group is at least one of crotonic acid and itaconic acid.

11. The aqueous dispersion according to claim 1, characterized in that said emulsifier is at least one of alkyl benzene sulfonate salt, alkyl sulfonate salt, poly(oxyethylene) alkyl phenolsulfate salt, styrene sulfonate, vinyl sulfonate salt, poly(oxyethylene) alkyl phenolether, poly(oxyethylene) alkylether, polyoxyethylene higher fatty acid ester, and an ethylene oxide propylene oxide block copolymer.

12. The aqueous dispersion according to claim 3, characterized in that said emulsifier is polyoxyethylene alkylphenolether.

13. The aqueous dispersion according to claim 1, characterized in that the diameter of said particles is approximately 0.02 to about 0.5 microns.

14. A method of production of an aqueous dispersion of particles of gelled fluoride resin comprising copolymerizing, in an aqueous medium and in the presence of an emulsifier, 5 to about 20% by weight of ethylene, 40 to about 60% by weight of a fluoro-olefin, 30 to about 50% by weight of a vinyl ester monomer of a carboxylic acid that has a straight alkyl chain or an alkyl branch or ring alkyl structure that contains 5 or more carbon atoms, 0.5 to about 3% by weight of a monomer containing an acid group, and 0.1 to about 2% by weight of a crosslinking monomer containing a hydrolyzable silyl group.

15. The method according to claim 14, characterized in that the degree of gellation of said gelled resin is 20 to about 100% by weight.

16. The method according to claim 14 wherein said crosslinking monomer further comprises at least one of hexadiene, octadiene, decadiene, tetradecadiene, 2-methyloctadiene, and decatriene.

17. The method according to claim 14 characterized in that said crosslinking monomer containing a hydrolyzable silyl group is at least one of vinyl triethoxysilane, γ-(meth)acryloyloxypropyltrimethoxysilane, γ-(meth)acryloyloxypropylmethyldimethoxysilane, γ-(meth)acryloyloxypropyltriethoxysilane, γ-(meth)acryloyloxypropylmethyldiethoxysilane, and tris(2-methoxyethoxy)vinylsilane.

18. The method according to claim 14, characterized in that said fluoro-olefin is at least one of chlorotrifluoroethylene, vinylidene fluoride, and hexafluoropropylene.

19. The method according to claim 14, characterized in that said vinyl ester monomer of a carboxylic acid that has a straight alkyl chain or an alkyl branch or ring alkyl structure that contains 5 or more barbon atoms is at least one of vinyl pivalate, vinyl caproate, vinyl versatate, vinyl laurate, vinyl stearate, and vinyl cyclohexane carboxylate.

20. The method according to claim 14, characterized in that said monomer containing an acid group is at least one of itaconic acid and crotonic acid.

21. The method according to claim 14, characterized in that said aqueous medium contains 70% or more by weight of water.

22. The method according to claim 14, characterized in that said aqueous medium contains 30% or less by weight of an organic solvent.

23. The method according to claim 22, characterized in that said organic solvent comprises at least one of a polyhalogenated hydrocarbon containing fluorine, and a polyhalogenated hydrocarbon containing chlorine.

24. The method according to claim 14, characterized in that the copolymerization reaction is carried out at a gauge pressure of 1 to about 100 kg/cm$^2$, a reaction temperature of 50° to about 150° C., and at a pH of 1.0 to about 6.0.

25. The method according to claim 14, further comprising removal of unreacted gaseous monomer after the completion of the copolymerization.

26. The method according to claim 25, characterized in that neutralization of all or part of the acid group in the obtained copolymer is carried out before the removal of unreacted gaseous monomer.

27. The method according to claim 25, characterized in that the addition of at least one of silicon and mineral oil compound to the obtained dispersion is carried out before the removal of unreacted gaseous monomer.

28. A preservation method for an alkaline hardened body comprising coating said hardened body with an aqueous dispersion of fine particles of gelled fluoride resin, wherein said fluoride resin is prepared from a fluoro-olefin, other monomers and a crosslinking monomer.

29. A preservation method for an alkaline hardened body comprising coating said hardened body with an aqueous dispersion of fine particles of gelled fluoride resin, wherein said fluoride resin is prepared from a fluoro-olefin, other monomers and a crosslinking monomer containing a hydrolyzable silyl group.

30. A preservation method for an alkaline hardened body comprising coating said hardened body with an aqueous dispersion of fine particles of gelled fluoride resin, wherein said fluoride resin is prepared from a fluoro-olefin, other monomers and a crosslinking monomer comprising at least one of hexadiene, octadiene, decadiene, tetradecadiene, 2-methyl-octadiene, and decatriene.

31. The method according to claim 29 wherein said crosslinking monomer further comprises at least one of hexadiene, octadiene, decadiene, tetradecadiene, 2-methyl-octadiene, and decatriene.

32. The preservation method according to any one of claims 28, 29, 30 and 31, wherein said alkaline inorganic hardened body is prepared from an alkaline substrate selected from the group consisting of cement mortar, cement concrete, aluminum light weight concrete, asbesto-concrete, ligneous cement and calcium silicate, said alkaline substrate having been formed into a desired shape and cured by hydrated crystallization.

33. An aqueous dispersion of particles of gelled fluoride resin prepared from a fluoro-olefin, other monomers and a crosslinking monomer, characterized in that said fluoride resin is obtained by mixing together and copolymerizing, in an aqueous medium and in the presence of an emulsifier, a fluoro-olefin, a second monomer, and, as a crosslinking monomer, a monomer comprising at least one of hexadiene, octadiene, decadiene, tetradecadiene, 2-methyl-octadiene, and decatriene.

34. A method of production of an aqueous dispersion of particles of gelled fluoride resin comprising copolymerizing, in an aqueous medium and in the presence of an emulsifier, 5 to about 20% by weight of ethylene, 40 to about 60% by weight of fluoro-olefin, 30 to about 50% by weight of carboxylic acid vinyl ester monomer of carboxylic acid that has a straight alkyl chain or an alkyl branch or ring alkyl structure that contains 5 or more caren atoms, 0.5 to about 3% by weight of a monomer containing an acid group, and 0.1 to about 2% by weight of a crosslinking monomer comprising at least one of hexadiene, octadiene, decadiene, tetradecadiene, 2-methyl-octadiene, and decatriene.

\* \* \* \* \*